March 15, 1966   L. PETERS ET AL   3,240,030
REFRIGERATED SERVING DISH FOR BUTTER PATTIES
Filed Feb. 11, 1964

INVENTORS:
LEO PETERS
ALBERT P. BURKE
DONALD R. SMITH
BY
*Dawson, Tilton, Fallon, Lungmus & Alexander*
ATT'YS

United States Patent Office 3,240,030
Patented Mar. 15, 1966

3,240,030
REFRIGERATED SERVING DISH FOR BUTTER PATTIES
Leo Peters, 750 Plymouth Road SE., Grand Rapids 6, and Albert P. Burke, Birmingham, and Donald R. Smith, Grand Rapids, Mich.; said Burke and Smith assignors to said Peters
Filed Feb. 11, 1964, Ser. No. 344,122
3 Claims. (Cl. 62—459)

This invention relates to a method and means for holding and serving butter patties, or the like, in a refrigerated condition on a dining table.

The serving of butter patties in restaurants may be classified as follows:

(1) About 30% are served and supported on individually patty-size paper chips. They are used primarily by eating establishments which are more concerned with speed and efficiency than they are with appearance or diner convenience.

(2) About 70% are served without any individual backing or support. They are served simply as individual pieces of butter, and are used by restaurants which are more concerned with appearance and diner convenience than they are with speed or efficiency.

It is this second, larger, finer restaurant group, with its emphasis on butter appearance and diner convenience for which our invention was developed. And it is the manner in which butter is now served in these restaurants that is the particular concern of this invention.

More particularly, this invention relates to a method and means whereby a refrigerant, such as ice, and a plurality of butter pats are maintained in out-of-contact, spaced relationship on a serving dish which conducts and/or exchanges refrigerating temperatures between the refrigerant and the butter. For purposes of illustration, throughout this disclosure we will use ice as the refrigerant.

The serving of butter pats in these better class restaurants presents problems and difficulties that are a source of constant irritation, dissatisfaction, high cost, and loss to restaurant owners. These difficulties center around the need for keeping butter at proper spreading and eating temperatures in dining rooms that are maintained at comfortable living temperatures.

Normal comfortable room temperatures are around 70° F. This is too warm for butter. At this temperature, butter begins to oil-off, loses its cool-fat appearance and its on-the-tongue coolant-flavor appeal. It becomes too soft to meet the standards required for attractive, easy, non-oily, spreading on bread or rolls. The serving of butter in most restaurants today is subject to this kind of deterioration.

Evidence that this is an old problem can be found in the existing prior patent art on this subject. Evidence that the problem still exists and that the prior art has not provided a commercially acceptable solution, can be had by casual observation of butter-serving methods in most any fine restaurant in the United States.

In an effort to eliminate the aforementioned difficulties, and to keep the butter cold, these better class restaurants serve butter pats in dishes or bowls along with crushed ice or ice cubes. While this keeps the butter from becoming soft, it also brings on some other disagreeable conditions, namely:

(1) At the 32° F. temperature of ice, butter is too cold for spreading, or even for proper knife penetration. It is hard and will crack and split apart under the cutting edge of a knife; and it is difficult for a knife to pick it up. At this temperature it can only be handled (not spread) by lumping it on bread or rolls. The lumping action will tear and break a slice of bread and will leave both bread and rolls heavily covered with butter in one place and devoid of butter in another place.

(2) The melting of, and pressures from, the ice spots the butter with unsightly and undesirable water and/or ice particles which soak into the bread or rolls, rendering them at least partially water-soggy.

(3) The pressures from the weight of the ice indent and mutilate butter patty surfaces, press some patties together into misshapen lumps that are unsightly, and result in losses to the restaurant.

(4) The butter and ice usually are so badly tumbled together that the butter is difficult to pick up on a knife.

(5) The direct contact between ice and butter, if maintained for an hour or more, will frequently bleach butter surfaces, leaving them with an unsightly white-mottled appearance.

(6) All of the above-mentioned conditions are bad enough for plain, undecorated butter pats, but they are ruinous for, and render noncommercial, the serving of pats having fine decorated surfaces, especially decorated butter pats such as those described in the copending application of Leo Peters, Serial No. 185,901, filed April 9, 1962.

Some attempts have been made to provide answers to some of these problems by means of various devices such as: dishes within dishes; troughs and platforms within and/or upon dishes; insulated and/or refrigerated walls for dishes, etc.; but, to date, none of these devices have met with any measurable degree of commercial acceptance. Each of them either did not offer any real improvement over older methods or, while curing some deficiencies, added others. Most of them appear to be awkward, difficult to handle, unsightly, and take up too much space on a restaurant table.

The entire net result is that present methods available for serving butter patties on restaurant tables are, at best, makeshift, messy, full of undesirable details, and completely unsuited for serving the fine surface-embossed butter patties described in the aforesaid copending application.

It is a general object of this invention to provide a method and means for serving butter patties on a dining table that will overcome all of the above-mentioned present day difficulties, and do so without adding new difficulties.

Another object which is both general and specific is to provide a method and means for serving butter patties on a dining table that:

(1) Maintains a plurality of patties within a temperature range that keeps butter both cold enough for fine appearance and taste, yet soft enough to be easily spreadable.

(2) Maintains said patties in an easily accessible but, at the same time, in a shape-protecting condition.

It is a specific object of this invention to provide a refrigerated butter patty serving dish that keeps ice (and iced water) and butter in separate, out-of-contact, compartmentized relationship, but at the same time in a temperature connected, cooperative contact.

Another specific object is to provide a refrigerated butter patty serving dish which will maintain ice (and iced water) within said dish in an elevated position relative to the location of the butter patties, so that as the ice melts and contracts the iced water will gravitate toward, not away, from the location of the butter patties.

Another specific object is to provide a method and means within a butter patty serving dish structure that will permit good conduction and/or exchange of temperatures between ice (and iced water) and the butter.

Another specific object is to provide a compact, space-conserving, refrigerated butter serving dish that provides comparatively large areas for both a refrigerant in an elevated position and a pluality of butter patties in a lower, subservient, position relative to the refrigerant.

Another specific object is to provide a butter serving dish in which the base of a refrigerated tower is directly against the nearest and never more than an approximate patty length away from the outermost surface on which butter patties are placed.

Another specific object is to provide a butter serving dish having a cooling tower, or refrigerated compartment, that will accommodate ice cubes, crushed ice, and/or iced water, and that will also function as an easily accessible handle for lifting and moving said dish.

A final specific object is to achieve all of the above objectives by means of a single integral and integrated structure.

To overcome the difficulties and achieve the objectives enumerated above, this invention has devised an amazingly simple and unique structure for serving butter patties. The structure which achieves this result and which is the subject of this invention, is arranged as follows:

(1) In general, the structure provides a relatively large, flat base on which rests a relatively tall and/or narrow tower-like compartment.

(2) The base may be varied in size or shape, depending upon the number of butter pats to be accommodated and the amount of room available on the table. But the variation is always such as to maintain the bottom of the tower-like compartment directly against the nearest, and never more than a patty-length away from the furthest, position of the butter pats. Maintenance of this tight positioning between refrigerant and butter yields maximum refrigeration for the butter with a minimum amount of refrigerant.

(3) The tower-like compartment is supported on the flat base in a direct heat exchange contact relationship and is always (a) tall enough to serve as a handle for easy grasping and lifting of the entire structure, (b) has a liquid-tight cubic area large enough to hold ice of a quantity that will require about one and one-half hours at normal room temperature before it is completely melted, and (c) in an elevated position relative to the position of the butter pats so that as the ice melts and contracts the resultant ice-water will gravitate toward, no away, from he butter, so that the direct heat exchange contact relationship between the tower-like compartment and the area of the butter is absolutely maintained, never reduced. Surprisingly (because it seems so obviously reasonable and necessary) this facility of our invention appears to be uniquely new in the art of butter patty serving.

(4) The ice and butter are each provided separate inviolate areas that maintain the two in an out-of-physical contact relationship so as to prevent the ice (and the water from its melting) from in any way contacting and/or damaging the butter.

(5) Sufficient space is provided for ice or other refrigerant so that enough ice can be present to maintain refrigeration during a period of about 1½ hours; this being the maximum time usually required to finish the entree portion of a leisurely dinner. One of the unique advantages of our tower-like compartment is that it can be made larger, if usage requires, simply by extending its height. This not only increases its refrigerant-holding capacity, but improves its function as a handle.

(6) Sufficient related space is provided for both the ice and the butter in mutual heat-exchange relationtionship so that the area provided for the butter may be altered to suit the number of pats desired on a single serving dish, and/or the space available on the dining table, without altering the tight positioning between the refrigerating tower and the butter.

(7) The material used for the server structure is most ideally that which is both a good conductor and exchange, medium for 32–65° F. heats, and is also acceptable, sanitary, non-toxic, non-oxidizable, and non-contaminating in contact with butter. In addition, it should be sufficiently strong and durable to maintain itself in good condition under the harsh treatment of restaurant handling and washing. Several plastics, metals, and ceramics alone and/or in combination can be used to meet these specifications. For simplicity in construction and for low maintenance cost for the restaurant, we prefer to use stainless steel for fabricating the server structure.

(8) The structural arrangement of our butter server provides an area of a size, shape, and location for the butter so as to accommodate a plurality of butter pats in a readily accessible position for a diner's use, and to make it easy for the server to be passed around and occupy only a relatively small space on a dining table.

(9) The size, location, and design of the ice-holding tower section of the serve is such as to prevent, or render very unlikely, any liquid portion of melting ice from spilling out of its confinement while the server is being carried to, or being lifted and passed around, a dining table.

(10) The structural arrangement of the server is such as to provide a firm, non-tippable base.

(11) The structure, in combination with the ice, maintains butter within the ideal holding-spreading temperature range of about 40–60° F., which will narrow down for the butter itself to an average temperature of about 50° F. At this average temperature (and within the above-mentioned temperature range), the body of butter is almost ideal for handling, easy to cut into and manipulate with a knife, and spreads smoothly and effortlessly.

(12) For the majority of restaurant dining tables, the dimensions most suitable for our butter serving dish are these: base section 5″ in diameter or square; tower section 2″ in diameter or square; and about 2″ in height. These dimensions may, of course, be changed to suit the requirements of individual restaurants without destroying or reducing the performance of the server or departing from the purposes of this invention.

To understand the surprising nature of this invention, one must consider the following:

(1) The long existence of the problems this invention is designed to overcome.

(2) The utter simplicity of the structure of this invention which is used to eliminate the several difficulties which have long plagued restaurant butter serving.

(3) Finally, and this particularly applies to the preferred structural arrangement of this invention, the surprising ability of a single, all-metal, one-piece structure to utilize the cooling temperatures of melting ice to maintain butter for 1½ hours within the ideal temperature range for appearance and spreading, and doing this in the presence of room temperatures that, in effect, also use the structure as a conductor of heat; and, at the same time, fulfilling all the other ideal requirements for a commercially acceptable butter server.

The invention is described in conjunction with the accompanying drawing, in which—

Figure 1:
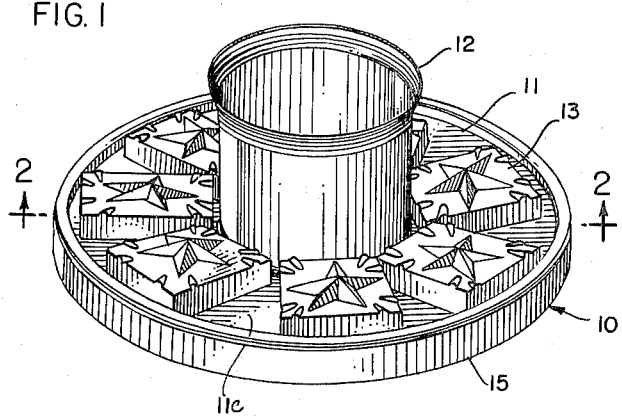
FIG. 1 is a perspective view of one embodiment of the invention, shown with surface-decorated butter patties disposed on the platform portion of the server.

In the illustration given and with particular reference to FIG. 1, the numeral 10 designates generally the inventive server which is seen to include a generally flat platform 11 and a cooling tower 12. The platform 11 supports a plurality of butter pats 13, while the cooling tower is adapted to receive a refrigerant such as the previously-mentioned ice cubes. One such ice cube is shown in dotted line and designated 14 in FIG. 2.

The platform 11 is seen to be equipped with an annular depending skirt or flange as at 15 (see particularly FIG. 2), which is provided integral with the server 10. Advantageously, the platform 11 is equipped with an annular bead or upstanding rib portion as at 16, serving to confine the patties 13 against accidental dislodgement.

The tower 12 is seen to be equipped with a flared upper rim as at 16 and a bottom portion that is closed by the central portion 11a of the platform 11. Advantageously, the flared rim facilitates the ease with which a waitress or diner may grasp, pick up, and move the server.

A variety of methods of attaching the tower 12 to the platform 11 may be employed, as by providing the platform with an annular groove as at 11b in which the lower portion 12a of the tower is soldered or otherwise secured.

Particular note should be taken of two very important and unique features of this invention, namely:

(1) The elevation of refrigerating tower 12 in relation to butter platform 11. This elevated relationship provides steady, close-as-possible, heat-exchange contact between the refrigerant in the tower and the butter on the platform throughout the effective life of the refrigerant regardless of the percentage of ice or iced water in the tower. This elevated position of the tower keeps the iced water gravitating and pressing toward, not away from, the butter. Thus, as the ice melts and the water level in the tower recedes from the contraction of the ice, it recedes toward, not away from, heat conductive contact with the butter.

(2) The tight contact between the base of refrigerating tower 12 and the butter on platform 11. Practically no space is permitted between the base of tower 11 and butter pats 13; and between the outer edges of the butter pats and the outer perimeter of platform 11. This not only helps provide maximum heat-exchange contact between refrigerating tower and butter, but reduces to a minimum any waste of refrigerant that would result from having areas of the platform not covered by butter.

It is believed that a specific example of the practice of the invention will aid in the understanding thereof, and for that purpose the following is set down:

Example

Figure 2:
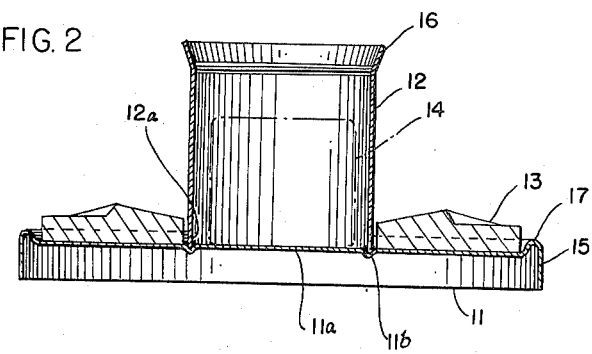
FIG. 2 is a sectional view taken along the sight line 2—2 applied to FIG. 1.

A server 10 of the shape seen in FIGS. 1 and 2 was constructed of Type 304 stainless steel. Such material of construction is advantageous since it meets the sanitation requirements of public eating places. The tower 12, at its base, i.e., 12a had an outside diameter of 1⅞", the tower and platform being constructed of 22 gauge thickness metal. Advantageously, the cooling tower should have an inside diameter of in excess of ¾" to accommodate commercially available ice cubes should cubes be used as the refrigeration source. For practical purposes, a one inch inside diameter is about minimum, and diameters up to about two inches provide optimum results.

The cooling tower 12 projected 1¹¹⁄₁₆" above the upper surface of the base 11, with the flared rim portion 16 being about ⅛" in height, the outside diameter of the cooling tower 12 at the top of the flare 16 being slightly under 2⅛", thus providing about a ⅛" entire perimeter clearance between the outside diameter of the tower and the flare; the circumference at the top of the flare being 6½". These dimensions for the flared rim provide the following three advantageous accommodations for a handle with which to grasp, lift, and move the server: (a) The 6½" circumference at the top of the flare provides ample room for grasping by all five fingers of almost any sized hand; (b) the relatively thin (22 gauge metal thickness) edge of the flare reduces to a minimum the area of contact needed for a firm, non-slip, grasp with which to move the server; while (c) the angle of the flare and its ⅛" perimeter clearance from the sides of the tower enable the server to be grasped, lifted, and moved without being contacted and/or smudged by large areas of one's fingers.

The platform measured 5" in diameter, with the combined skirt 15 and bead 16 measuring ½" in height. The bead 16 had a radical width of about ³⁄₁₆", so that the annular radius of the platform, i.e., that designated 11c in FIG. 1, measured 1¹⁵⁄₁₆". This is advantageous for supporting and confining butter patties normally provided 1"–1¼" on a side. For most commercial applications, we find it advantageous to provide the annular radius 11c at least 1", and preferably of the order of 1¼". Utilizing an arrangement such as has just been described, we are able to place seven chips or patties 13 in spaced circumferential relationship on the platform 11 and maintain the patties in easily penetratable condition, i.e., at about 50° F., for the normal dining period.

We also find it advantageous to provide the platform with a substantially flat top surface, since this maximizes the contact between the patties and the surface to facilitate heat transfer. It also maintains the patties in original condition, which is desirable particularly when surface-decorated patties are provided.

Figure 3:
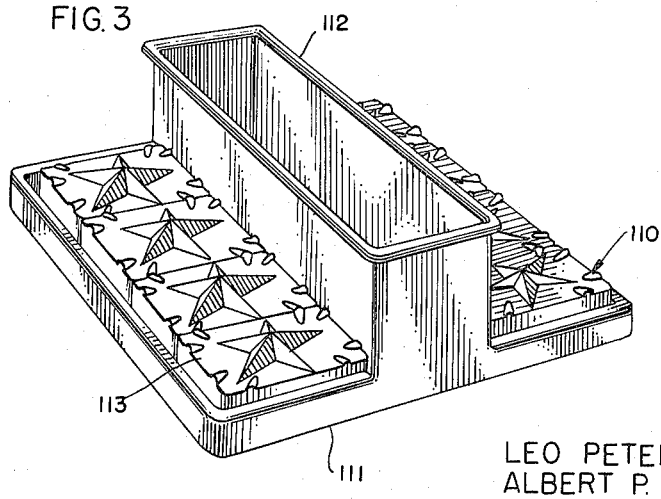
FIG. 3 is a perspective view of a modification of the invention.

Reference is now made to FIG. 3, wherein an alternative form of the invention is seen, the server 110 having a generally rectangular, as contrasted to circular, configuration. Again, however, the server includes a base 111 which carries (advantageously integrally) a cooling tower 112. The platform 111 is seen to carry a plurality of patties 113 of the surface-decorated type. It will be appreciated, however, that the invention provides a benefit with undecorated patties as well.

While in the foregoing specification a detailed description of an embodiment of the invention has been set down for the purpose of explanation, many variations in the details herein given may be made by those skilled in the art without departing from the spirit and scope of the invention.

We claim:

1. A butter patty server, comprising a generally flat, imperforate platform means having an integral peripheral skirt whereby said platform is supportable above a dining table, said platform means being sized to accommodate the length of a butter pat of the order of 1¼" between its inner and outer perimeters, a cooling tower integral with said platform so as to be in thermal conductive relation therewith and projecting centrally thereabove, the dimensions of said tower being sized to receive an ice cube, said platform skirt and tower constituting a unitary body constructed of material having excellent heat conductive properties whereby heat is adapted to be transferred from patties supported on said platform to the interior of said tower.

2. The structure of claim 1 in which said platform is generally circular in plan.

3. The structure of claim 1 in which said platform is generally rectangular in plan.

References Cited by the Examiner

UNITED STATES PATENTS

| | | | |
|---|---|---|---|
| 181,950 | 11/1876 | Kromer | 62—460 |
| 187,784 | 2/1877 | Townsend | 62—457 |
| 330,193 | 11/1885 | Babbitt | 62—457 |
| 1,731,604 | 11/1929 | Allen | 62—457 X |
| 1,949,285 | 2/1934 | Porter | 220—23.8 X |
| 2,113,920 | 4/1938 | Leppke | 220—23.8 |
| 2,542,173 | 2/1951 | Wolf | 62—438 X |
| 2,544,824 | 3/1951 | Clifford | 62—457 X |

ROBERT A. O'LEARY, *Primary Examiner.*

LLOYD L. KING, *Examiner.*